United States Patent

Wang et al.

Patent Number: 5,869,021
Date of Patent: Feb. 9, 1999

[54] RARE EARTH—ZSM-5/ZSM-11 COCRYSTALLINE ZEOLITE

[75] Inventors: Oingxia Wang; Shurong Zhang; Guangyu Cai; Feng Li; Longya Xu; Zuxian Huang; Yuying Li, all of Liaoning, China

[73] Assignees: China Petro-Chemical Corporation, Beijing; Dalian Institute of Chemical Physics, Chineses Academy of Sciences, Liaoning; Fushun Petrochemical Company of Sinopec, Fushun, all of China

[21] Appl. No.: 575,090

[22] Filed: Dec. 19, 1995

[30] Foreign Application Priority Data

Dec. 30, 1994 [CN] China ................. 94113403.2

[51] Int. Cl.⁶ .................. C01B 39/36; C01B 39/38; C01B 39/46
[52] U.S. Cl. .................. 423/718; 423/708; 423/713; 423/DIG. 22; 423/DIG. 29; 502/77
[58] Field of Search .................. 423/708, 713, 423/DIG. 22, DIG. 29, 718; 502/77

[56] References Cited

U.S. PATENT DOCUMENTS

| | | | |
|---|---|---|---|
| 3,402,996 | 9/1968 | Maher et al. | 502/79 |
| 3,702,886 | 11/1972 | Arganer et al. | 423/705 |
| 3,769,386 | 10/1973 | Rundell et al. | 423/713 |
| 4,107,224 | 8/1978 | Dwyer | 585/449 |
| 4,108,881 | 8/1978 | Rollmann et al. | 423/DIG. 29 |
| 4,139,600 | 2/1979 | Rollmann et al. | 423/708 |
| 4,229,424 | 10/1980 | Kokotailo | 502/64 |
| 4,289,607 | 9/1981 | Kokotailo | 208/120 |
| 4,372,839 | 2/1983 | Oleck et al. | 208/59 |
| 4,585,638 | 4/1986 | Kuehl | 423/708 |
| 4,681,747 | 7/1987 | Desmond et al. | 502/77 |
| 4,721,609 | 1/1988 | Baacke et al. | 423/DIG. 22 |
| 5,068,434 | 11/1991 | Klug et al. | 564/399 |
| 5,232,675 | 8/1993 | Shu et al. | 423/328.2 |

FOREIGN PATENT DOCUMENTS

| | | | |
|---|---|---|---|
| 1192891 | 9/1981 | Canada | 423/DIG. 22 |
| 1127134 | 7/1982 | Canada | 423/DIG. 22 |
| 1052290A | 6/1991 | China . | |
| 1058382A | 2/1992 | China . | |
| 2 033 358 | 5/1980 | United Kingdom . | |

OTHER PUBLICATIONS

Inorganic Cation Exchange Properties of Zeolite; pp. 58–79; Stephen T. Wilson et al.; 1983, *Intrazeolite*Chemistry (No Month).

*Primary Examiner*—Michael Marcheschi
*Attorney, Agent, or Firm*—Burns, Doane, Swecker & Mathis LLP

[57] ABSTRACT

A rare earth-containing zeolite with a cocrystalline structure of ZSM-5 and ZSM-11, wherein the weight ratio of the moiety having the crystalline structure of ZSM-5 to the moiety having the crystalline structure of ZSM-11 is 0.1 to 10, which has, in the sodium form, the X-ray diffraction pattern set forth in Table 1, and in its originally synthesized anhydrous state, a chemical formula in terms of mole ratios of oxides as follows: $0.1-1.0\ Na_2O.0.01-1.0\ RE_2O_3.Al_2O_3.20-300\ SiO_2$. Said zeolite has good acid hydrothermal stability and resistance against impurity contamination, and is useful as catalyst in various hydrocarbon conversions.

5 Claims, No Drawings

RARE EARTH— ZSM-5/ZSM-11 COCRYSTALLINE ZEOLITE

FIELD OF THE INVENTION

The present invention relates to a crystalline aluminosilicate zeolite, the preparation process and the use thereof. More specifically, the present invention relates to a rare earth-containing aluminosilicate zeolite with a cocrystalline structure of ZSM-5 and ZSM-11, a process for preparing the same, and the use of said zeolite in the catalytic conversion of hydrocarbons.

BACKGROUND OF THE INVENTION

Zeolite ZSM-5 is a kind of high silicon zeolite with Pentasil structure developed by Mobil Oil Corporation (U.S. Pat. No. 3,702,886) and is widely used as catalytic material in isomerization, disproportionation, catalytic cracking and catalytic dewaxing due to its unique pore structure. U.S. Pat. No. 4,107,224 discloses a process for preparing ethylbenzene by the alkylation of benzene with ethylene utilizing zeolite ZSM-5 catalyst, wherein the raw material ethylene needs to be diluted with inert hydrocarbons. For the sake of industrial application, diluted ethylene is obtained from the tail gases of some devices in an oil refinery, such as dry gas of catalytic cracking, coke oven gas and the like. However, when such tail gases are used as sources of diluted ethylene, they require to be pretreated to remove the impurities therein such as hydrogen sulfide, water, carbon dioxide and the like until the contents of them are below 10 ppm.

Zeolite having a structure intermediate that of ZSM-5 and ZSM-11(hereafter refered to as a ZSM-5/ZSM-11 intermediate), another zeolite product developed by Mobil Oil Corporation (U.S. Pat. No. 4,229,424), is prepared by using quaternary ammonium salt as template. The ZSM-5/ZSM-11 intermediate has a characteristic X-ray diffraction pattern and such structures intermediate that of ZSM-5 (designated as I) and ZSM-11(designated as S) as SISI, SSII, IISIIISI, SSSISI, IISISI, etc., and it has, in anhydrous state, a chemical formula in terms of mole ratios of oxides as follows: $0.9\pm0.3\ M_{2/n}O:Al_2O_3:ZSiO_2$, wherein M is a cation, preferably hydrogen or a hydrogen precursor, e.g, ammonium cation; n is the valence of the cation; and Z is at least 5 and may be up to 5000. It is taught in the patent that the cations in the zeolites can be replaced, at least in part, by ion exchange with other cations in accordance with techniques well-known in the art. U.S. Pat. No. 4,289,607 further discloses the use of said zeolite in catalytic reactions, such as the conversion of methanol to gasoline, oligomerization of olefins, alkylation of aromatics, isomerization of xylene, catalytic cracking of hydrocarbons and the like.

In general, incorporation of rare earth elements into zeolites will increase the activity and stability of the zeolites. For example, REY zeolites obtained by ion-exchange treatment of NaY zeolites with $RE^{3+}$ cation have higher cracking activity and hydrothermal stability than those of NaY zeolites (U.S. Pat. No. 3,402,996). However, with respect to such high silicon zeolites as ZSM-5, ZSM-11 and ZSM-5/ZSM-11, due to their high silica to alumina ratio and therefore less electric charge centers and high hydrophobility as well as smaller pore openings in the channel of zeolite, it is very difficult to incorporate such trivalent cations of large ionic radius as rare earth cations into the channel of those zeolites in aqueous medium by conventional ion-exchange techniques, thus $RE^{3+}$ is less likely to coordinate with the electronegative centers of aluminium on the low density skeleton (P. Cho and F. G. Dwyer, ACS Symp. Ser., 218, 59–78, 1983). GB2,033,358A discloses the preparation of zeolite ZSM-5 containing metal, including trivalent metal, by adding salts of mineral acids including salts of trivalent metals to the raw materials of zeolite synthesis. And CN 89108836.9, CN 90104732.5 and U.S. Pat. No. 5,232,675 discloses the synthesis of high silicon ZSM-5 zeolites containing rare earth elements by employing rare earth-containing faujusite as crystal seed. So far, these have been the reports known to incorporate rare earth into ZSM-5 zeolite by synthesis instead of conventional ion-exchange techniques. But it has never been reported how a rare earth-containing zeolite with a cocrystalline structure of ZSM-5 and ZSM-11 can be directly synthesized.

An object of the invention is to provide a directly synthesized rare earth-containing zeolite with a cocrystalline structure of ZSM-5 and ZSM-11. Another object of the invention is to provide a process for preparing the zeolite. A further object of the invention is to provide uses of the zeolite in catalytic conversions.

SUMMARY OF THE INVENTION

The zeolite provided by the invention is the one containing rare earth and having a cocrystalline structure of ZSM-5 and ZSM-11, wherein the weight ratio of the moiety having the crystalline structure of ZSM-5 to the moiety having the crystalline structure of ZSM-11 is 0.1–10, which has, in the sodium form, the X-ray diffraction pattern set forth in Table 1, and, in its originally synthesized anhydrous state, a chemical formula in terms of mole ratios of oxides as follows:

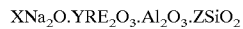
$$XNa_2O \cdot YRE_2O_3 \cdot Al_2O_3 \cdot ZSiO_2$$

wherein X=0.1–1.0,
Y=0.01–1.0, and
Z=20–300.

The zeolite of the present invention is prepared in the presence of water glass, an aluminium source, a mineral acid and a salt of rare earth element by using $C_2$–$C_8$ diamine as template. The zeolite is useful as catalyst in alkylation of aromatics, aromatization of alkanes, conversion of methanol to light olefins and the like.

DETAILED DESCRIPTION OF THE INVENTION

The zeolite of the invention contains a single rare earth element or a mixture thereof, and has a cocrystalline structure of ZSM-5 and ZSM-11, wherein the weight ratio of the moiety having the crystalline structure of ZSM-5 to the moiety having the crystalline structure of ZSM-11 is 0.1–10, whose chemical formula in its originally synthesized anhydrous state in terms of mole ratios of oxides is as follows:

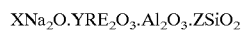
$$XNa_2O \cdot YRE_2O_3 \cdot Al_2O_3 \cdot ZSiO_2$$

wherein X=0.1–1.0,
Y=0.01–1.0, and
Z=20–300.

Like all of the other zeolites, the zeolite of the invention can have its sodium cations replaced by other cations by conventional ion-exchange techniques, that is, the as-synthesized Na-zeolite can be converted to other forms such as ammonium or hydrogen, zinc, gallium, magnesium form and the like by ion exchange techniques.

The zeolite of the invention has, in its sodium form, the X-ray diffraction pattern set forth in Table 1. The X-ray diffraction analysis was carried out in accordance with standard measuring technique by using radiation of K-α doublet of copper, wave filtration of nickel and a scintillation counter. The interplanar spacing (d) in the Table corresponding to each diffraction line was calculated according to Bragg Equation from the position of each diffraction peak (2 θ, wherein θ represents the Bragg angle) recorded on the chart. In the Table, the relative intensity, $100I/I_0$, is the ratio of each diffraction peak height (i.e, diffraction intensity) I to the highest diffraction peak height (i.e, the strongest diffraction intensity ) $I_0$ multiplied by 100, wherein VS (very strong) represents a relative intensity value of 100–60, S (strong) represents 60–40, M (medium) represents 40–20, and W(weak) represents less than 20.

TABLE 1

| d (Å) | $100I/I_0$ |
| --- | --- |
| 11.2 ± 0.2 | M |
| 10.1 ± 0.2 | M |
| 6.05 ± 0.14 | W |
| 4.40 ± 0.08 | W |
| 3.86 ± 0.07 | VS |
| 3.72 ± 0.07 | S |
| 3.65 ± 0.07 | W - M |
| 2.01 ± 0.02 | W |

Table 2 shows the X-ray diffraction pattern of the zeolite provided by the present invention together with that of the ZSM-5/ZSM-11 intermediate crystalline zeolite which has been granted the patent, It can been seen from Table 2 that there are some differences between the positions but significant differences between the relative intensities of the two groups of diffraction lines.

TABLE 2

| d (Å) | ZSM5/ZSM11 (USP4, 229, 424) $100I/I_0$ | Zeolite of the Invention $100I/I_0$ |
| --- | --- | --- |
| 11.2 ± 0.2 | VS | M |
| 10.1 ± 0.2 | VS | M |
| 6.73 ± 0.14 | W | — |
| 6.05 ± 0.14 | — | W |
| 4.63 ± 0.08 | W | — |
| 4.40 ± 0.08 | — | W |
| 3.86 ± 0.07 | S | VS |
| 3.72 ± 0.07 | M - S | S |
| 3.65 ± 0.07 | — | W - M |
| 2.01 ± 0.02 | W | W |

The zeolite of the invention has a surface area of 300 to 400 m$^2$/g determined by BET low temperature nitrogen adsorption method. The adsorption capacities of the zeolite towards n-hexane and cyclohexane at 25° C. and a partial pressure of adsorbates of20 mmHg are 9 to 11% and 3 to 5% by weight, respectively, and the adsorption capacity of the zeolite towards water at25° C. and a partial pressure of adsorbate of 12 mmHg is 4 to 8% by weight.

The zeolite of the invention is prepared in the presence of water glass, an aluminium source, a mineral acid and a salt of rare earth element by using $C_2$–$C_8$ diamine as template. More specifically, a zeolite product is obtained by mixing a homogeneous mixture I composed of water glass, a $C_2$–$C_8$, diamine and water with a homogeneous mixture II composed of an aluminium source, a mineral acid, a salt of rare earth element and water under vigorous stirring to form a gel, then crystallizing the gel under stirring at a temperature of 100° to 200° C. for 0.5 to 4 days, followed by rapidly cooling to room temperature and washing with deionized water until a pH of 8 to 9, and finally drying.

In the preparation process of the invention, said diamine is selected from any one or a mixture of two of $C_2$–$C_8$ primary diamines. Said aluminium source is selected from an aluminium salt of a mineral acid comprising aluminium chloride, aluminium bromide, alumimium nitrate, aluminium sulfate and aluminium phosphate. Said mineral acid is selected from a group comprising sulfuric acid, hydrochloric acid, nitric acid and phosphoric acid, preferably sulfuric acid. Said salt of rare earth element is preferably selected from a chloride, nitrate and sulfate salt of a single rare earth element or a mixture thereof.

In the process, the mole ratio of the above raw materials are as follows:

$Na_2O/Al_2O_3$: 7–12; $RE_2O_3/Al_2O_3$: 0.01–1.0; $SiO_2/Al_2O_3$:30–600; $H_2O/SiO_2$: 20–100; amine /$SiO_2$: 0.1–0.5.

In the process of the invention, addition of a lower molecular weight diamine or a mixture thereof as tempelate contributes to the increase of the ZSM-5 content in the cocrystalline zeolite. Furthermore, the ratio of ZSM-5 to ZSM-11 of the cocrystalline zeolite may be adjusted by changing crystallization temperature and controlling crystallization time.

The zeolite provided by the invention has good hydrothermal stability and resistance against contamination by impurities such as hydrogen sulfide, water, carbon monoxide and carbon dioxide. The zeolite of the invention can be further modified like other zeolites by conventional ion-exchange techniques to be provided with various catalytic properties and the modified zeolite, with the aid of suitable matrix, can be made into catalysts required by various processes. For example, the zeolite can be converted to hydrogen form by ion-exchanging with ammonium cations and heating, and used as catalyst for the alkylation of aromatics; and the zeolite can be converted to zinc or gallium form by ion exchanging with zinc or gallium cations and used as catalyst for the aromatization of alkanes; the zeolite can also be converted to magnesium form by ion exchanging with magnesium cations and used as catalyst for the conversion of methanol to light olefins. The zeolite can also be converted to other forms and used in other reactions such as hydrocarbon conversions, e.g. isomeriztion, cracking, disproportionation and the like.

EXAMPLES

The following examples will further illustrate the invention but they are not intended to limit the scope of the invention.

In the examples, the unit cell parameters and the weight ratio of the moiety having the crystalline structure of ZSM-5 to the moiety having the crystalline structure of ZSM-11 of the zeolite products were determined by X-ray diffraction method. The contents of sodium and rare earth and the silica to alumina ratio were determined by atomic absorption spectrometry. The adsorption capacities towards n-hexane and cyclohexane were determined at 25° C. and a partial pressure of adsorbate of 20 mmHg. The adsorption capacity towards water was determined at 25° C. and a partial pressure of adsorbate of 12 mmHg.

Example 1

Preparation of the La—ZSM-5/ZSM-11 corcrystalline zeolite of the invention by using hexamethylene diamine as template 3000 ml water glass (containing 180 g/l of $SiO_2$; 60 g/of $Na_2O$), 1900 ml of deionized water and 250 g of 98% hexamethylene diamine were mixed homogeneously to give operating solution I.

51 g of 97% $AlCl_3.6H_2O$, 400 ml of 4M $H_2SO_4$, 35 g of 99% $LaCl_3.6H_2O$ and 2100 ml of deionized water were mixed homogenieously to give operating solution II.

The above two operating solutions were mixed under vigorous stirring to form a gel. The stirring was continued for another 30 minutes, then the rotation rate was lowered to about 100 rpm. Crystallization was carried out at 175° C. under stirring for 72 hours.

The material from crystallization was rapidly cooled to room temperature. The resulting crystal was washed with deionized water until the pH was washed to be 8 to 9, filtered, and dried at 110°±10° C. for 10 hours to give the La—ZSM-5/ZSM-11 cocrystalline zeolite.

The zeolite has the X-ray diffraction pattern set forth in Table 1 and its detailed diffraction pattern is shown in Table 3. The zeolite has a silica to alumina ration of 53, a La content of 2.50% by weight and a weight ratio of the moiety having the crystalline structure of ZSM-5 to the moiety having the crystalline structure of ZSM-11 of 30:70. In this zeolite, the unit cell parameters of the crystalline structure of ZSM-5 are as follows: a=2.0118 nm, b=1.9970 nm, c=1.3426 nm, and the unit cell volume V=5.393 $nm^3$; the unit cell parameters of the crystalline structure of ZSM-11 are as follows: a=b=1.9989 nm, c=1.3420 nm, and the unit cell volume V=5.362 $nm^3$. The adsorption capacities of the zeolite towards n-hexane, cyclohexane and water are 10.2%, 4.1% and 6.0% by weight, respectively.

Example 2

Preparation of the La—ZSM-5/ZSM-11 cocrystalline zeolite of the invention by using tri m iethylene diamine as template 600 ml of water glass (the same as that in Example 1), 420 ml of deionized water and 34 g of 98% trimethylene diamine were mixed homogeneously to give operating solution I.

3.5 g of 98% $Al_2(SO_4)_3.18H_2O$, 77 ml of 4M $H_2SO_4$, 3.3 g of 99% $LaCl_3.6 H_2O$ and 380 ml of deionized water were mixed homogeneously to give operating solution II.

The above two operating solutions were mixed under vigorous stirring to form a gel. The stirring was continued for another 5 minutes, then the rotation rate was lowered to about 100 rpm. Crystallization was carried out at 180° C. under stirring for 56 hours.

The material from crystallization was rapidly cooled to room temperature. The resulting crystal was washed with deionized water until the pH was washed to be 8 to 9, filtered, and dried at 110°±10° C. for 10 hours to give the La—ZSM-5/ZSM-11 cocrystalline zeolite.

The zeolite has the X-ray diffraction pattern set forth in Table 1 and its detailed diffraction pattern is shown in Table 3. The zeolite has a silica to alumina ratio of 180, a La content of 1.15% by weight and a weight ratio of the moiety having the crystalline structure of ZSM-5 to the moiety having the crystalline structure of ZSM-11 of 50:50. The adsorption capacities of the zeolite towards n-hexane, cyclohexane and water are 10.6%, 4.0% and 4.8% by weight, respectively.

Example 3

Preparation of the RE—ZSM-5/ZSM-11 cocrystalline zeolite of the invention by using hexamethylene diamine as template 580 ml of water glass (the same as that in Example 1), 420 ml of deionized water and 58 g of 98% hexamethylene diamine were mixed homogeneously to give operating solution I.

49.5 g of water-containing $AlPO_4$ gel (containing 5.4% by weight of $Al_2O_3$), 74 ml of 4M $H_2SO_4$, 13.4 g of 98% $RECl_3.6 H_2O$ (wherein the weight ratio of $La_2O_3$ to $Ce_2O_3$ was 0.6) and 351 ml of deionized water were mixed homogeneously to give operating solution II.

The above two operating solutions were mixed under vigorous stirring to from a gel. The stirring was continued for another 5 minutes, then the rotation rate was lowered to about 100 rpm. Crystallization was carried out at 110° C. under stirring for 16 hours. The system was again heated to 180° C. and the crystallization was continued under stirring for another 38 hours.

The material from crystallization was rapidly cooled to room temperature. The resulting crystal was washed with deionized water until the pH was washed to be 8 to 9, filtered, and dried at 110°±10° C. for 10 hours to give the RE—ZSM-5/ZSM-11 cocrystalline zeolite.

The zeolite has the X-ray diffraction pattern set forth in Table 1 and its detailed diffraction pattern is shown in Table 3. The zeolite has a silica to alumina ratio of 35, a RE content of 4.50% by weight, and a weight ratio of the moiety having the crystalline structure of ZSM-5 to the moiety having the crystalline structure of ZSM-11 of 40:60. The adsorption capacities of the zeolite towards n-hexane, cyclohexane and water are 9.8%, 3.2% and 6.5% by weight, respectively.

Example 4

Preparation of the La—ZSM-5/ZSM-11 cocrystalline zeolite of the invention by using the mixture of ethylene diamine and hexamethylene diamine as template 400 ml of water glass (containing 223 g/l of $SiO_2$; 70.4 g/l of $Na_2O$), 326 ml of deionized water, 13 g of 98% ethylene diamine and 21 g of 98% hexamethylene diamine were mixed homogeneously to give operating solution I.

11.5 g of 99% $Al_2(SO_4)_3.18H_2O$, 67 ml of 4M $H_2SO_4$, 11 g of 99% $LaCl_3.6H_2O$ and 370 ml of deionized water were mixed homogeneously to give operating solution II.

The above two operating solutions were mixed under vigorous stirring to form a gel. The stirring was continued for another 5 minutes, then the rotation rate was lowered to about 100 rpm. Crystallization was carried out at 170° C. under stirring for 70 hours.

The material from the crystallization was rapidly cooled to room temperature. The resulting crystal was washed with deionized water until the pH was washed to be 8 to 9, filtered, and dried at 110°±10° C. for 10 hours to give the La—ZSM-5/ZSM-11 cocrystalline zeolite.

The zeolite has the X-ray diffraction pattern set forth in Table 1 and its detailed diffraction pattern is shown in Table 3. The zeolite has a silica to alumina ratio of 60, a La content of 5.20% by weight, and a weight ratio of the moiety having the crystalline structure of ZSM-5 to the moiety having the crystalline structure of ZSM-11 of 60:40. The adsorption capacities of the zeolite towards n-hexane, cyclohexane and water are 11.7%, 3.0% and 5.3% by weight, respectively.

TABLE 3

| Example 1 | | Example 2 | | Example 3 | | Example 4 | |
|---|---|---|---|---|---|---|---|
| d(Å) | 100 I/I$_0$ | d(Å) | 100 I/I$_0$ | d(Å) | 100 I/I$_0$ | d(Å) | 100 I/I$_0$ |
| 11.182 | 34 | 11.225 | 35 | 11.224 | 31 | 11.230 | 36 |
| 10.017 | 28 | 10.065 | 29 | 10.063 | 28 | 10.081 | 30 |
| 5.960 | 7 | 6.010 | 6 | 6.005 | 8 | 6.017 | 9 |
| 4390 | 16 | 4.389 | 17 | 4.386 | 15 | 4.387 | 16 |
| 4.291 | 15 | 4.300 | 16 | 4.289 | 12 | 4.295 | 13 |
| 3.885 | 100 | 3.865 | 100 | 3.853 | 100 | 3.862 | 100 |
| 3.821 | 56 | 3.823 | 53 | 3.824 | 54 | 3.825 | 55 |
| 3.731 | 46 | 3.733 | 44 | 3.732 | 57 | 3.734 | 46 |
| 3.647 | 21 | 3.649. | 24 | 3.650 | 23 | 3.651 | 26 |
| 3.360 | 10 | 3.355 | 10 | 3.350 | 12 | 3.358 | 11 |
| 3.065 | 12 | 3.063 | 13 | 3.056 | 12 | 3.057 | 11 |
| 2.975 | 10 | 2.994 | 11 | 2.998 | 15 | 2.997 | 13 |
| 2.965 | 10 | 2.964 | 10 | 2.963 | 13 | 2.965 | 12 |
| 2.011 | 11 | 2.016 | 12 | 2.017 | 12 | 2.016 | 12 |
| 2.004 | 12 | 2.003 | 11 | 2.009 | 11 | 2.008 | 12 |

Example 5

This example illustrates that the rare earth-containing cocrystalline zeolite of the invention has good acid hydrothermal stability.

Four samples of the zeolites prepared in Examples 1 to 4 were calcined at 540° C. for 5 hours to remove organic amine template , then were ammonium ion exchanged with a mixed solution of 0.8 N NH$_4$NO$_3$ and 0.1 N NH$_4$OH, respectively. The ion exchanged zeolites were washed with deionized water until no NO$_3$ could be detected, filtered and then dried at 110°±10° C. for 24 hours to give ammonium form samples with a sodium content of less than 0.05% by weight. The ammonium form samples were converted to hydrogen form by calcining at 540° C. for 4 hours.

The hydrogen form samples were calcined at 550°±20° C. in the presence of 100% steam for 4 hours. Water fed into the calciner was 5 to 10 ml/g sample per hour.

The changes of the acid amounts of the samples before and after hydrothermal treatment were determined by ammonia adsorption-temperature programming desorption (TPD) respectively wherein helium at a flow rate of 20 ml/min was used as carrier gas. A sample was preactivated in the adsorption tube at 600° C. for 45 minutes, then cooled to 150° C., to which was injected ammonia at constant temperature for adsorption. After saturation of adsorption, the sample was purged for 30 minutes, and the desorption of ammonia was carried out at a temperature-rise rate of 20° C./min. The signal of ammonia desorbed at a specific temperature range was recorded by a chromatograph and the amount of acid sites of the sample was calculated by area normalization method with the result shown in Table 4.

In Table 4, the total amount of acid sites was calculated from the signal of ammonia desorbed at the desorption temperature of 200° to 600° C. "Acid sites of medium strength %" refered to the percentage content of the amount of acid sites of medium strength after hydrothermal treatment based on the total amount of the acid sites, and the amount of acid sites of medium strength was calculated from the signal of ammonia desorbed at the desorption temperature of 320° to 450° C.

As can be seen from the data in Table 4, the rare earth-containing cocrystalline zeolite of the invention has good acid hydrothermal stability which has great industrial application significance with respect to the catalytic process involving hydrothermal treatment such as the regeneration of catalysts.

TABLE 4

| Zeolite | Relative Amount of Total Acid Sites | | Acid Sites of Medium strength % |
|---|---|---|---|
| | Before Hydrothermal Treatment | After Hydrothermal Treatment | |
| Example 1 | 100 | 91 | 66 |
| Example 2 | 100 | 86 | 60 |
| Example 3 | 100 | 88 | 57 |
| Example 4 | 100 | 92 | 62 |

Example 6

This example illustrates the use of the zeolite of the invention in the alkylation of benzene with diluted ethylene.

The zeolite of Example 1 was mixed with alumina trihydrate at a weight ratio of zeolite (dry base):Al$_2$O$_3$=65:35. To the mixture was added a suitable amount of 20% nitric acid and sesbania powder, mixed and kneaded, and then extruded to form granules of φ2×2–3 mm. The granules were dried at 110° to 120° C. for 24 hours and were calcined at 450° C. for 1 hour, at 500° C. for 1 hour and at 540° C. for 5 hours. After cooling, the zeolite of the catalyst was converted to hydrogen form by ion exchanging with ammonium ions and calcining as described in Example 5; and the resulting catalyst sample of hydrogen form was hydrothermally treated at 550°±20° C. in the presence of 100% steam for 4 hours as described in Example 5.

5 ml of the above catalyst sample after hydrothermal treatment was charged into a 10 ml continuous flow fixed bed reactor to carry out the alkylation of benzene with diluted ethylene. The raw material diluted ethylene gas was composed of 20% of ethylene, 20% of hydrogen and 60% of nitrogen by volume. The alkylation was carried out at a temperature of 370° C., a pressure of 0.7 MPa, a weight hourly space velocity of ethylene of 1.0 hr$^{-1}$ and a mole ratio of benzene to ethylene of 5. The results of the alkylation were as follows: the conversion of ethylene was 98.8%; the selectivity to the product ethylbenzene was 91.5%; and the selectivity of the alkylation was 99.0%, based on the total yield of ethylbenzene and diethylbenzene.

Example 7

This example illustrates the use of the zeolite of the invention in the alkylation of benzene with ethylene in the dry gas of catalytic cracking.

A post hydrothermal treatment zeolite catalyst sample of hydrogen form was prepared as described in Example 6.

100ml of the above catalyst sample was charged into a 200 ml adiabatic continuous flow fixed bed reactor, and the alkylation of benzene was carried out by using dry gas of catalytic cracking as raw material. The dry gas of catalytic cracking was composed of 33.0% of methane, 19.5% of ethylene, 16.0% of ethane, 14.0% of hydrogen, 10.2% of nitrogen, 4.0% of carbon dioxide, 1.5% of carbon monoxide, 0.8% of oxygen, 0.8% of propylene, 0.2% of propane by volume and 3500 mg/m$^3$ of hydrogen sulfide and 1500 ppm water. The alkylation was carried out at an inlet temperature of the reactor of 350° C., an outlet temperature of the reactor of 425° C., a pressure of 0.7 MPa (gauge), a weight hourly space velocity of ethylene of 1.0 hr$^{-1}$ and a mole ratio of benzene to ethylene of 5. The reactor was continuously run for 45 days. The conversion of ethylene was maintained at 99 to 95%, the conversion of propylene was maintained at above 90%, and the selectivity of the alkylation based on the total yield of ethylbenzene and diethylbenzene was maintained at about 99%. An alkylation selectivity of 99% could be maintained after continuous running of the catalyst for 65 days when the conversion of ethylene was controlled at above 92%.

Example 8

This example illustrates the use of the zeolite of the invention in the aromatization of alkane.

Zeolite/alumina granules were prepared and calcined at 450° C., 500° C. and 540° C. as described in Example 6, then were ion exchanged with ammonium ions as described in Example 5. the resulting zeolite catalyst of ammonium form was impregnated in an aqueous zinc nitrate solution at room temperature for 12 hours, filtered, dried at 110°±10° C. for 6 hours and calcined at 500° C. for 3 hours. The resulting zeolite catalyst of zinc form was then treated at 550°±20° C. in the presence of 100% steam for 4 hours as described in Example 5. The catalyst sample contains 2.0% by weight of zinc.

5ml of the above catalyst sample was charged into a 10 ml continuous flow fixed bed reactor to carry out the aromatization of propane. The aromatization was carried out at a temperature of 500° C., a pressure of 1 atm and a weight hourly space velocity of propane of 1.5 hr$^{-1}$. The results of the aromatization were as follows: the once—through conversion of propane was 75%, the selectivity to aromatics was 58% by weight, and the weight ratio of benzene: toluene:xylene was 1:0.9:0.4.

Similiar results were obtained when the zeolite catalyst was modified by gallium nitrate instead of zinc nitrate and a catalyst sample containing 2.0% by weight of gallium was used in the above aromatization of propane.

Example 9

This example illustrates the use of the zeolite of the invention in the conversion of methanol to light olefins.

A zeolite catalyst of hydrogen form was prepared as described in Example 6, and a catalyst sample containing 2.4% by weight of magnesium was prepared according to the modification method described in Example 8 by substituting magnesium nitrate for zinc nitrate.

5ml of the above catalyst sample was charged into a 10 ml continuous flow fixed bed reactor to carry out the conversion of methanol. The conversion was carried out at a temperature of 500° C., a pressure of 1 atm and a weight hourly space velocity of methanol of 1.5 hr$^{-1}$. The results of the conversion were as follows: the conversion of methanol was 100%, and the yield of hydrocarbons in the product was 99.5%, wherein methane comprised 0.50%, ethylene comprised 16.75%, propylene comprised 54.70% and butylene comprised 20.30%, with the balance being $C_2$–$C_4$ alkane.

What is claimed is:

1. A process for preparing a rare earth-containing crystalline aluminosilicate zeolite, the process comprising mixing a homogeneous mixture I composed of water glass, a $C_2$–$C_8$ diamine and water with a homogeneous mixture II composed of an aluminum source, a mineral acid, a salt of a rare earth element and water under vigorous stirring to form a gel, then crystallizing the gel under stirring at a temperature of 100° to 200° C. for 0.5 to 4 days, followed by rapidly cooling to room temperature and washing with water until a pH of 8 to 9, and finally drying, wherein the mole ratios of the above raw materials in the mixture before gelation are as follows: $Na_2O/Al_2O_3$:7–12; $RE_2O_3/Al_2O_3$: 0.01–1.0; $SiO_2/Al_2O_3$:30–600; $H_2O/SiO_2$:20–100; and the diamine/$SiO_2$:0.1–0.5, wherein said rare earth-containing crystalline aluminosilicate zeolite comprises:
(1) a cocrystalline structure of ZSM-5 and ZSM-11, wherein the weight ratio of the moiety having the crystalline structure of ZSM-5 to the moiety having the crystalline structure of ZSM-11 is 0.1 to 10;
(2) in its originally synthesized anhydrous state, a chemical formula in terms of mole ratios of oxides as follows:

$$XNa_2O \cdot YRE_2O_3 \cdot Al_2O_3 \cdot ZSiO_2$$

wherein X=0.1–1.0.
Y=0.01–1.0, and
Z=20–300;
(3) the X-ray diffraction pattern set forth in Table 1; and
(4) adsorption capacities towards n-hexane, cyclohexane and water of 9 to 11%, 3 to 5% and 4 to 8% by weight, respectively.

2. The process according to claim 1, wherein said diamine is selected from any one or a mixture of two of $C_2$–$C_8$ primary diamines.

3. The process according to claim 1, wherein said aluminum source is selected from the group consisting of aluminum chloride, aluminum bromide, aluminum nitrate, aluminum sulfate and aluminum phosphate.

4. The process according to claim 1, wherein said mineral acid is selected from the group consisting of sulfuric acid, hydrochloric acid, nitric acid and phosphoric acid.

5. The process according to claim 1, wherein said salt of said rare earth element is a salt of a single rare earth element or a mixture of different salts of a single rare earth element, and is selected from the group consisting of a chloride, nitrate and sulfate salt or a mixture of chloride, nitrate and/or sulfate salts.

* * * * *